United States Patent [19]

Shibata

[11] Patent Number: 5,239,825
[45] Date of Patent: Aug. 31, 1993

[54] EXHAUST EMISSION CONTROL DEVICE FOR OUTBOARD MOTOR

[75] Inventor: Yasuhiko Shibata, Hamamatsu, Japan

[73] Assignee: Sanshin Kogyo Kabushiki Kaisha, Hamamatsu, Japan

[21] Appl. No.: 835,289

[22] Filed: Feb. 13, 1992

[30] Foreign Application Priority Data

Feb. 13, 1991 [JP] Japan .................. 3-041119

[51] Int. Cl.⁵ .............................. F01N 3/28
[52] U.S. Cl. ...................... 60/302; 60/321; 422/179; 440/89
[58] Field of Search ........... 60/302, 299, 321, 298; 422/179; 440/89

[56] References Cited

U.S. PATENT DOCUMENTS

| 4,663,934 | 5/1987 | Sickels | 60/302 |
| 4,735,046 | 4/1988 | Iwai | 60/297 |
| 4,848,082 | 7/1989 | Takahashi | 440/89 |
| 4,866,932 | 9/1989 | Morita | 422/179 |

FOREIGN PATENT DOCUMENTS

| 2345383 | 3/1975 | Fed. Rep. of Germany | 60/302 |
| 57-150099 | 3/1981 | Japan . | |
| 1043890 | 9/1966 | United Kingdom | 60/302 |

Primary Examiner—Douglas Hart
Attorney, Agent, or Firm—Ernest A. Beutler

[57] ABSTRACT

The present invention provides an improved exhaust emission control arrangement for an outboard motor. A catalyst material holding structure is mounted within an exhaust passage of an engine. A thermally insulating interstice is located between an inner wall of the exhaust passage and the outer periphery of the catalyst material holding structure, so that the interstice physically separates the catalyst material holding structure from the inner wall of the exhaust passage. The interstice prevents significant heat transfer between the catalyst material reaction sites at which exhaust gas cleansing takes place and engine components which are positioned proximate thereto. The invention permits the effective cleansing of exhaust gases under all engine operating conditions.

19 Claims, 3 Drawing Sheets

EXHAUST EMISSION CONTROL DEVICE FOR OUTBOARD MOTOR

BACKGROUND OF THE INVENTION

This invention relates to an exhaust gas purifying device for a watercraft propulsion unit and, more particularly, to an improved catalytic gas exhaust treatment arrangement for an engine associated with such a unit.

It is well known that exhaust gases from an internal combustion engine may be treated by a system that includes a catalyst that will cause a chemical reaction to occur that renders certain of the exhaust gas constituents harmless. In connection with such arrangements, it is conventional to position the catalyst in such a manner that it is contained within the exhaust system or an exhaust passage of the engine.

The treatment of the exhaust gases from an internal combustion engine is particularly important with outboard motors. As is well known, such outboard motors oftentimes discharge their exhaust gases into the atmosphere back through the body of water in which the outboard motor is operating. As such, it is particularly important to remove from the exhaust gases materials which would pollute the water in which the watercraft is operating.

In outboard motors, like many other applications, it is desirable to insure good contact between the exhaust gases and the catalyst in order to insure effective treatment before discharge to the atmosphere. Also, it is desirable to insure that the catalyst operates at the necessary temperature so as to achieve the desired exhaust gas treatment. In an effort to attain, and maintain, a high enough temperature so that the catalyst may perform its intended functions effectively, the catalyst is sometimes placed close to exhaust output ports which lead directly from the engine's combustion chambers. A suitable operating temperature for the catalyst is likely to be found at such a location since the hot exhaust gases will help to provide the desired high temperature.

The problem of treating the exhaust gases in an outboard motor is particularly acute. One of the main reasons for this is due to the extremely compact nature of an outboard motor. It is, of course, desirable to achieve a good and complete catalytic treatment of the exhaust gases, while maintaining a compact structure for an outboard motor.

Unfortunately, the prior emission control arrangements which employ a catalyst contained within an exhaust passage, as set forth above, may not permit the realization of all of the above-discussed desirable objectives under all engine operating conditions.

Such known catalytic devices are often in direct contact with certain other engine parts. Under low load engine operating conditions a portion of the heat generated as a result of the emission control catalytic reactions is, thus, transferred from the reaction sites to these other engine parts. Accordingly, it is difficult to raise the temperature at the reaction sites to the necessary temperature for activating the catalyst, and to maintain this temperature during low load engine operation, as the heat is traveling away from the catalyst and on to the associated engine parts. Consequently, it is difficult to effectively treat exhaust gases under low load conditions. This is especially true in a structure wherein the catalyst is placed proximate to the exhaust ports leading from the combustion chambers as the amount of heat imparted to the catalyst will be particularly high and, thus, the amount of heat transferring away from the catalytic reaction sites will be high.

Furthermore, under high load engine operating conditions, the transfer of heat from the reaction sites to the other engine parts makes the engine susceptible to overheating. Of course, where the catalyst is placed proximate the combustion chamber exhaust ports, and therefore incurs a particularly high degree of heat, such problem is particularly troublesome. The susceptibility of the engine to readily overheat during high load engine operation necessitates the utilization of a larger sized water pump in combination with the engine, than otherwise would be required, in order to prevent engine overheating. Accordingly, the overall size of the engine encasement assembly must be increased somewhat to accommodate the engine and large water pump, and the degree of design freedom for placement of the engine parts is decreased.

It is, therefore, a principal object of this invention to provide an improved arrangement for treating the exhaust gases in an internal combustion engine with a catalyzer.

It is a further object of this invention to provide an exhaust emission control arrangement, having a catalyst disposed in an engine exhaust passage, which permits good contact of engine exhaust gases with the catalyst and which allows the ready attainment, and maintenance, of the temperature of catalyst activation.

It is still a further object of this invention to provide an exhaust emission control arrangement, having a catalyst disposed in an engine exhaust passage, which is compact in size, yet which provides a high degree of design freedom for placement of the various engine parts within an encasement assembly.

SUMMARY OF THE INVENTION

The present invention provides an exhaust emission control arrangement for an outboard motor. The arrangement comprises a catalyst material holding structure and an engine. The engine has an exhaust passage through which exhaust gases produced within the engine may pass. The catalyst material holding structure is mounted within the exhaust passage of the engine. A thermally insulating interstice is located between an inner wall of the exhaust passage and the outer periphery of the catalyst material holding structure. The interstice physically separates the catalyst material holding structure from direct contact with the inner wall of the exhaust passage.

DETAILED DESCRIPTION OF THE PREFERRED EMBODIMENT

Figure 1:
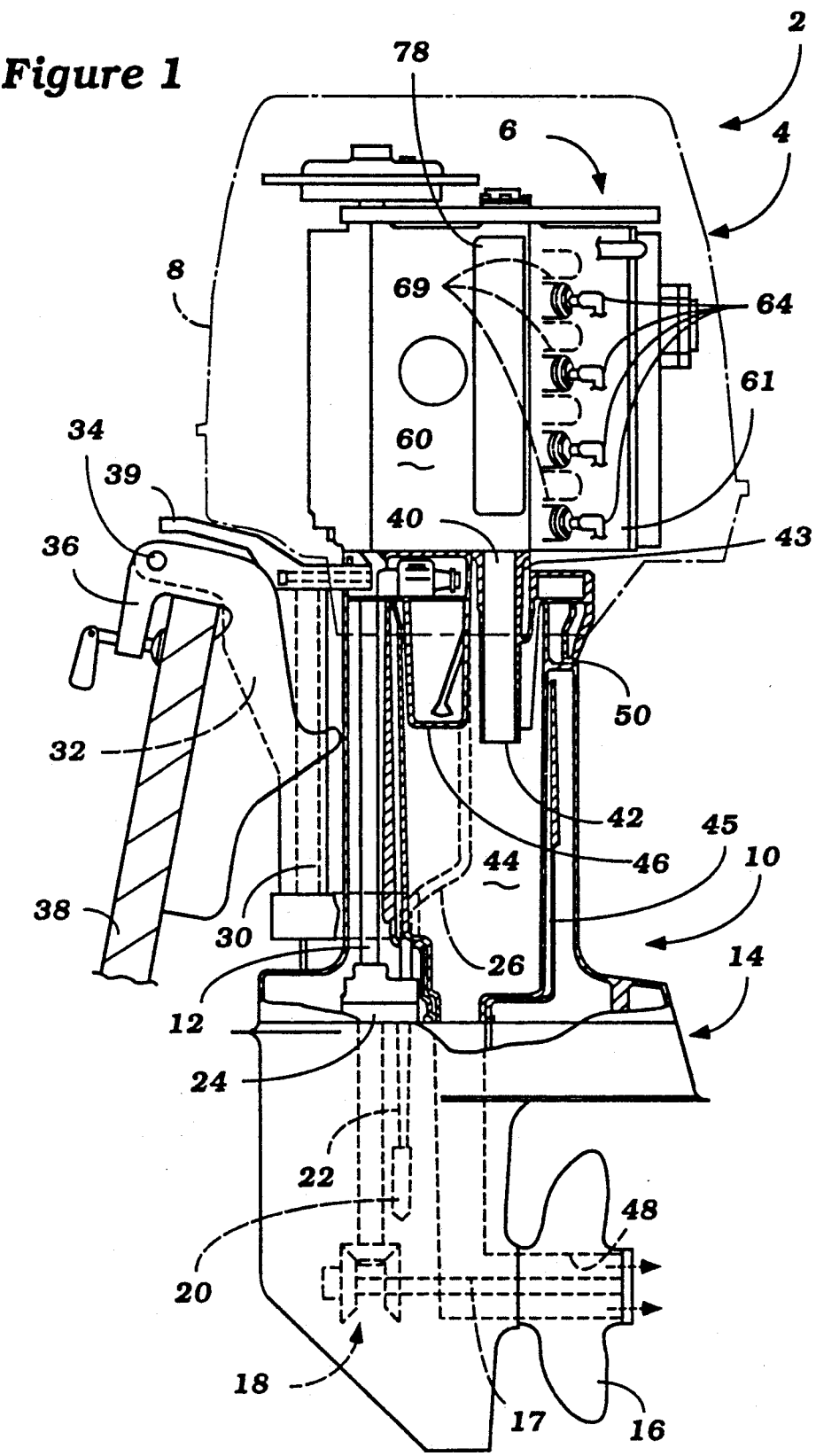
FIG. 1 is a side elevational view of an outboard motor, with portions broken away and portions shown in phantom, that typifies the environment in which the invention may be employed.

Referring first to FIG. 1, an outboard motor constructed in accordance with the present invention is identified generally by the reference numeral 2. The outboard motor includes a power head, indicated generally by the reference numeral 4, which is comprised of an internal combustion engine 6 and a surrounding protective cowling, shown in phantom and indicated at 8. The engine may be of any suitable type, and in the illustrated embodiment of FIG. 1 is depicted as being of the four-cycle, four cylinder type. The engine 6 is disposed so that its output shaft (not shown) rotates about a vertically extending axis. It is to be understood that the invention may be utilized in conjunction with engines of other cylinder numbers and various cylinder dispositions, or with engines operating on the two stroke principle.

A drive shaft housing 10 depends from the power head 4 and rotatably journals a drive shaft 12 that is rotatably coupled to the engine output shaft in a known manner. A lower unit 14, positioned beneath the drive shaft housing 10, rotatably journals a propeller 16 and its propeller shaft 17, and drives the propeller 16 through a suitable forward, neutral, reverse transmission 18.

The engine 6 is of the water-cooled type and the coolant is derived from the body of water in which the outboard motor 2 operates through a water intake 20 that is positioned within the lower unit 14 and from which a supply conduit 22 extends. A coolant pump 24 is disposed at the lower end of the drive shaft housing 10 and is driven by the drive shaft 12 in a known manner. Pressurized coolant is delivered from the pump 24 to the engine 6 through a supply line 26 that extends upwardly through the drive shaft housing 10 and which terminates at an inlet (not shown) of the engine 6.

A steering shaft 30 is affixed to the driveshaft housing 10 and is journaled within a swivel bracket 32 for steering of the outboard motor 2 about a vertically extending axis. The swivel bracket 32 is, in turn, pivotally supported by means of a pivot pin 34 and clamping bracket 36 for tilting movement of the outboard motor 2 about a horizontally disposed tilt axis defined by the pivot pin 34. The clamping bracket 36 may be detachably connected to a transom 38 of an associated watercraft. Steering of the outboard motor can be effected by an operator via a steering handle 39 which is affixed proximate the upper end of the steering shaft 30.

The engine 6 has an exhaust system that includes an exhaust outlet port 40 which opens through a lower face of the outer casing of the engine 6. The exhaust outlet 40 communicates with an exhaust pipe 42 that is contained within an expansion chamber 44 formed internally of the drive shaft housing 10. The exhaust gases flow through the exhaust pipe 42, and specifically through an exhaust passage formed therein, for expansion in the expansion chamber 44 to achieve silencing.

An oil pan or sump 46 is positioned near the exhaust pipe 42 in an upper region of the drive shaft housing 10. Lubricant is circulated from the oil sump 46 to the portions of the engine 6 to be lubricated and returned to the sump in any suitable manner.

Water jackets 43 and 45 surround portions of the exhaust pipe and expansion chamber, respectively. These water jackets, 43 and 45, help to cool the exhaust gases as they pass along the exhaust pathway of the outboard motor 2, and thereby help to maintain a low temperature within the drive shaft housing 10 and lower unit 14. The water jacket 43, in particular, helps to keep the exhaust pipe 42 cool to prevent any significant degree of heat transfer to the nearby oil sump 46, and the lubricant contained therein.

The lower unit 14 is provided with an underwater exhaust gas discharge 48, through the hub of the propeller 16, so that the exhaust gases from the engine 6 may be discharged beneath the level of the body of water in which the outboard motor 6 is operating, under normal running conditions. A small, above the water exhaust outlet 50 is also provided for allowing exhaust gases to escape directly to the atmosphere during low speed and idle engine operation.

Figure 2:
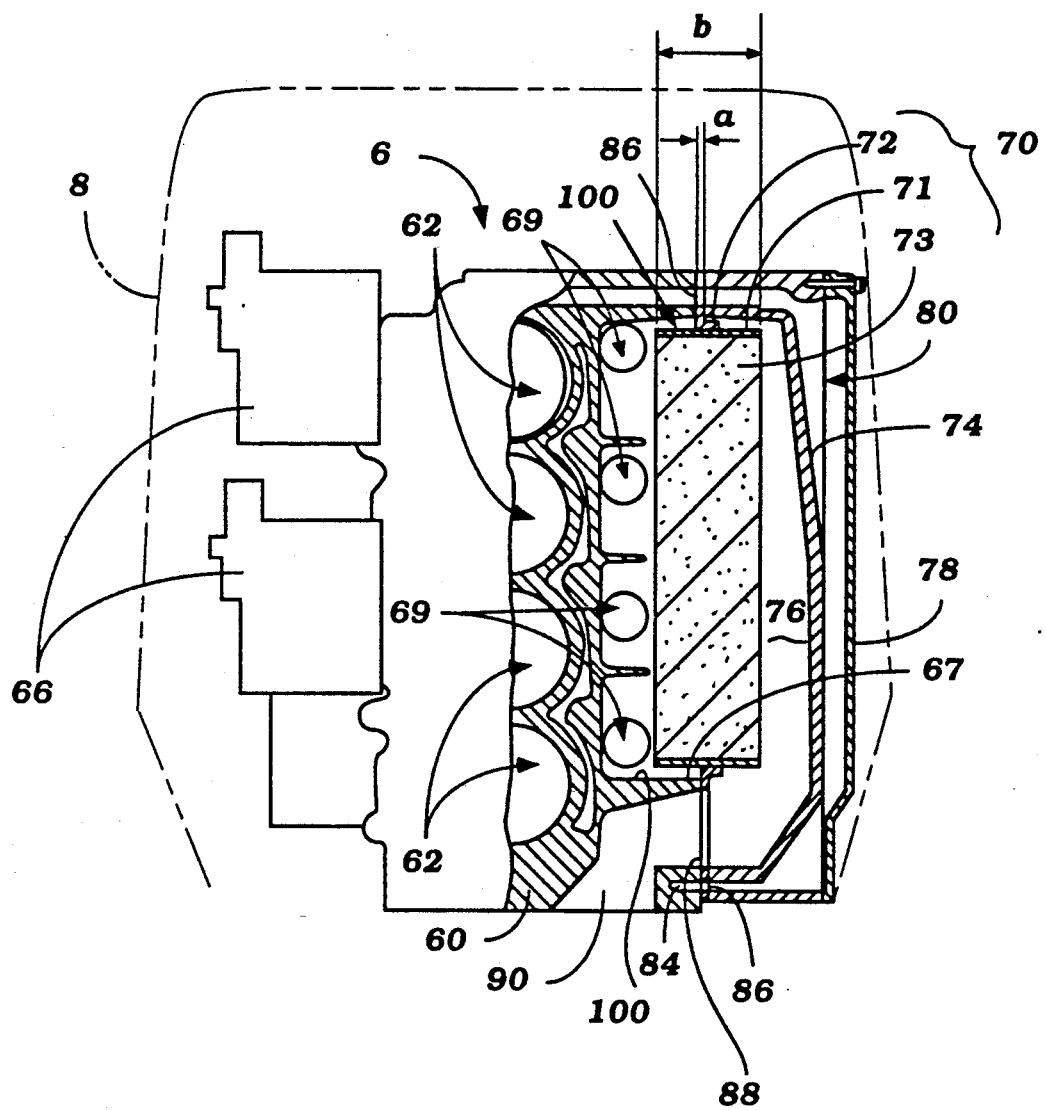
FIG. 2 is an enlarged cross-sectional view showing a portion of the motor, including a catalyst arrangement, as constructed in accordance with the present invention.

Referring now additionally to FIG. 2, the engine 6 includes a cylinder block 60 and a mating cylinder head 61. The cylinder block 60 has a plurality of horizontally extending, and vertically spaced, cylinder bores 62 formed therein. Pistons (not shown) are supported for reciprocation within the cylinder bores 62 and are connected by means of connecting rods (not shown) to a crankshaft (not shown). The crankshaft is drivingly coupled to the drive shaft 12 in a suitable manner.

The cylinder head 61 is provided with internal recesses (not shown) which cooperate with a respective cylinder bore 62 and piston to form a respective combustion chamber (not shown). An ignition plug 64 (FIG. 1) is supported within the cylinder head 61 at an end of each cylinder bore 62. Each ignition plug 64 has its respective gap, across which a spark may be generated by any suitable ignition system, disposed within one of the combustion chambers.

An air-fuel charge is fed to each combustion chamber by way of a charge forming device 66. The ignition plugs 64 are fired at an appropriate time with respect to the current position of the crankshaft in order to ignite the air-fuel charge and impart mechanical power from the pistons ultimately to the drive shaft 12.

After such firing, during an exhaust stroke of the pistons, the spent air-fuel charge (exhaust gases) is moved from each combustion chamber to an exhaust collection section 67, via exhaust passages 69 leading from each respective combustion chamber. The exhaust passages 69 open from a respective combustion chamber and extend outwardly into a portion of the cylinder head 61. The exhaust passages 69 then curve back through the cylinder head 61 and extend towards the cylinder block 60, in a generally U-shaped configuration. The exhaust passages 69 then continue in a direction leading back alongside their respective cylinder bores 62, and ultimately terminate at their respective exhaust gas exit ports. It is at this location that the exhaust passages' 69 output ports open into the exhaust collection section 67. Such an exhaust passageway arrangement is illustrated and described in U.S. Pat. No. 4,621,595 to Suzuki, and assigned to the assignee hereof, which patent is hereby expressly incorporated herein by reference.

Much of the above-described construction and operation of the outboard motor 2 can be considered to be conventional; thus, such features, alone, do not define the specific subject matter of the present invention. The engine 2, as set forth above, is meant to represent a preferred embodiment, and typical environment, for practicing this invention. Accordingly, those components of the engine 2 which are not described in detail may be considered to be conventional.

Next, the construction and operation of the emission control arrangement, in accordance with the present invention, will be described in detail.

In accordance with the invention, a catalyst unit, denoted by the reference numeral 70, is provided in a location which is proximate to the exit ports of the exhaust passages 69, so that the hot exhaust gases issuing therefrom will impinge upon the catalyst material 73 helping to achieve, and maintain, the optimum operating temperature for the catalyst material 73 and, thus, to effectively treat the exhaust gases. The catalyst material 73 is preferably of an oxidizing type, and may comprise any suitable known material for effecting oxidation of the exhaust gases.

Figure 3:
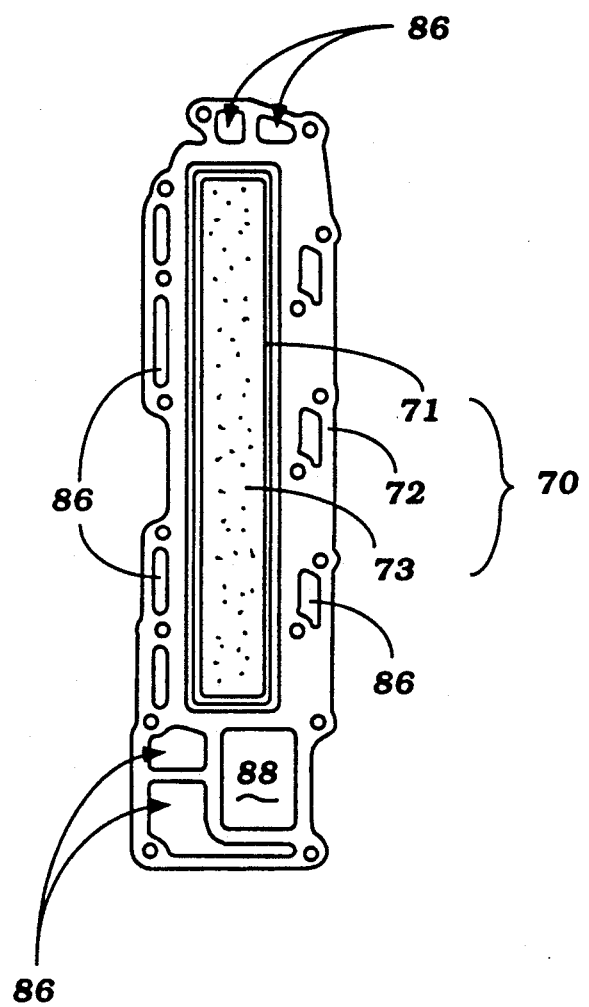
FIG. 3 shows the catalyst and its associated mounting arrangement, as constructed in accordance with the present invention.

With reference to FIGS. 2 and 3, the catalyst material 73 is secured in place within a holding structure 71. A mounting bracket 72 is provided with a flanged portion which, in turn, is adjoined to a portion of the holding structure 71. Together, the catalyst material 73, the holding structure 71, and the mounting bracket 72, comprise the catalyst unit 70 of the present invention.

As mentioned above, the mounting bracket 72 is secured in place within the exhaust passageway of the engine 6 proximate to the output ports of the exhaust passages 69, as shown in FIG. 2. More specifically, the catalyst unit 70 is located between the cylinder block 60 and a first cover member 74. The first cover member 74 defines an outer boundary of an exhaust channel 76 on a side of the catalyst unit 70 which is opposite the side thereof which faces towards the exhaust collection chamber 67. The catalyst unit 70 is held within the exhaust passage in an airtight fashion so that all exhaust gases emitted during engine operation must pass through the catalyst for treatment prior to entering the atmosphere. A lowermost portion of the exhaust channel 76 mates with an opening for a further exhaust passageway 90 which is located within the cylinder block 60 of the engine 6. The further exhaust passageway leads downwardly towards, and opens into, the exhaust pipe 42, described above.

A second cover member 78 is secured outwardly of the first cover member 74. The region in between the first and second cover members, 74 and 78, defines a water chamber, which is denoted by the reference numeral 80, through which water coolant may flow. The water chamber 80 communicates with further water jackets, 82 and 84, which are located within the cylinder block 60.

The mounting bracket 72 is provided with holes 86 therethrough which permit such fluid communication between the various water jackets, 82 and 84 (and possibly others which are not specifically illustrated), and the water chamber 80. An additional hole 88 is provided through the mounting bracket 72 in order to permit the exhaust gases to flow from the exhaust channel 76 into the further exhaust passageway 90, within the cylinder block 60, and ultimately to the atmosphere through the exhaust system of the outboard motor 2, as described earlier.

The width of the mounting bracket 72 as shown in the cross-sectional view of FIG. 2, and denoted by the reference letter "a", is considerably smaller than the width, along the same direction, of the catalyst holding structure 71, which latter width is denoted by the reference letter "b". Furthermore, the vertical length of the catalyst unit 70, as measured from the uppermost portion of the holding structure 71 to the lowermost portion of the holding structure 71, is shorter than the length of the exhaust collection section 67 as measured along the same direction. Such dimensions allow for the provision of a gap of empty space, or interstice, 100 located within the exhaust collection section 67 between the inner wall of the exhaust collection section 67 and the outer periphery of the holding structure 71 of the catalyst unit 70.

The gap 100 serves to thermally insulate the catalyst unit 70 from the inner wall of the exhaust collection section 67. As a result of such construction, heat which is developed with regard to the catalytic treatment of the exhaust gases will not readily transfer to the engine parts which surround the catalyst unit 70.

By employing the above-detailed emission control system construction, the temperature at the catalyst reaction sites may be readily raised to the necessary temperature for activating the catalyst, and such temperature may be easily maintained, during low load engine operation, as the heat is generally well insulated against travelling away from the catalyst and on to any proximately located engine parts. Thus, the exhaust gases may be effectively treated under low load conditions.

Furthermore, under high load engine operating conditions, the inhibition of the transfer of heat from the catalyst reaction sites to the other engine parts avoids the problem of engine susceptibility to overheating. Thus, it is not required to utilize a larger sized water pump in combination with the engine, than otherwise would be required, in order to prevent engine overheating. Accordingly, the overall size of the engine encasement assembly need not be increased in order to accommodate the engine and a large water pump, and so there is no reduction in the degree of design freedom for placement of the engine parts.

Although a very effective construction has been illustrated and described above for an improved emission control arrangement for an outboard motor, which will permit the effective catalytic treatment of engine exhaust gases during both high load and low load engine operating conditions, various changes and modifications may be made without departing from the spirit and scope of the invention as defined by the appended claims.

It is claimed:

1. An exhaust emission control arrangement for an outboard motor comprising: a catalyst material holding structure and an engine, said engine having an exhaust passage through which exhaust gases produced within said engine may pass, said catalyst material holding structure mounted within said exhaust passage of said engine; and further comprising means for reducing conductive heat transfer from said catalyst material holding structure to other components of said engine; wherein said heat transfer reducing means includes a thermally insulating interstice located between an inner wall of said exhaust passage and the outer periphery of said catalyst material holding structure, wherein said interstice physically separates said catalyst material holding structure from direct contact with said inner wall of said exhaust passage; and wherein said heat transfer reducing means further includes a mounting bracket securing said catalyst material holding structure against said engine within said exhaust passage, said mounting bracket bridging said interstice from said catalyst material holding structure to said inner wall of said exhaust passage, and wherein said mounting bracket has a low conductive heat transfer cross-section along the direction of exhaust gas flow through said catalyst material holding structure; and wherein said heat transfer reducing means further includes a coolant jacket for containing a coolant, said coolant jacket defined in part by a least one passage through said mounting bracket, and wherein said coolant can contact said mounting bracket.

2. The exhaust emission control arrangement of claim 1 further comprising a plane within which a majority of said mounting bracket is generally disposed; and wherein the width of said mounting bracket as measured along a direction perpendicular to said plane is smaller than the width of said catalyst material holding structure as measured along said plane.

3. The exhaust emission control arrangement of claim 1 wherein said mounting bracket mounts said catalyst material holding structure in an airtight fashion within said exhaust passage so that all exhaust gases passing from one side of said catalyst material holding structure to the other side of said catalyst material holding structure must flow through the catalyst material holding structure.

4. The exhaust emission control arrangement of claim 3 further comprising an unobstructed passageway through a portion of said mounting bracket for permitting a fluid to readily pass therethrough.

5. The exhaust emission control arrangement of claim 4 wherein said fluid comprises exhaust gases.

6. The exhaust emission control arrangement of claim 5 wherein said engine comprises a cylinder block and a cylinder head, said cylinder head and said cylinder block being secured proximate to one another; and wherein said exhaust passage comprises a first exhaust gas ingress which opens into said cylinder head, a first exhaust gas egress which exits out of said cylinder head, a first exhaust gas pathway formed within said cylinder head and which communicates said first exhaust gas ingress with said first exhaust gas egress; a second exhaust gas ingress which opens into said cylinder block, a second exhaust gas egress which exits out of said cylinder block, a second exhaust gas pathway formed within said cylinder block and which communicates said second exhaust gas ingress with said second exhaust gas egress; a third exhaust gas pathway which communicates said first exhaust gas egress with said second exhaust gas ingress; an exhaust pipe, and a third exhaust gas ingress which opens into said exhaust pipe and which mates with said second exhaust gas egress.

7. The exhaust emission control arrangement of claim 6 wherein said third exhaust gas pathway comprises an exhaust gas collection section and an exhaust channel, wherein said exhaust gas collection section is located within said cylinder block and said exhaust channel is located externally of said cylinder block.

8. The exhaust emission control arrangement of claim 7 wherein said first exhaust gas egress opens into said exhaust gas collection section, said exhaust gas collection section opens into said exhaust channel, and said exhaust channel opens into said second exhaust gas ingress.

9. The exhaust emission control arrangement of claim 8 further comprising a separating wall formed by a portion of said cylinder block, wherein said separating wall is located between said exhaust gas collection section and said second exhaust gas pathway.

10. The exhaust emission control arrangement of claim 9 wherein said catalyst material holding structure is mounted at a location whereat said exhaust gas collection section meets said exhaust channel.

11. The exhaust emission control arrangement of claim 10 further comprising a cover member which defines the outer boundary of said exhaust channel and which is secured against said cylinder block.

12. The exhaust emission control arrangement of claim 11 wherein said mounting bracket is interposed between said cylinder block and said cover member, and said unobstructed passageway of said mounting bracket is positioned so that it allows said exhaust gases to pass between said exhaust channel and said second exhaust gas ingress.

13. The exhaust emission control arrangement of claim 4 wherein said fluid comprises liquid coolant.

14. The exhaust emission control arrangement of claim 13, wherein said coolant jacket includes a first water jacket and a second water jacket; and also comprising an exhaust channel; wherein said first water jacket is disposed within said cylinder block; wherein said second water jacket communicates with said first water jacket and said second water jacket is located externally of said cylinder block; and wherein said unobstructed passageway of said mounting bracket is positioned between said first water jacket and said second water jacket so that water may pass from one water jacket to the other via said unobstructed passageway.

15. The exhaust emission control arrangement of claim 14 wherein said second water jacket communicates a first region of said first water jacket with a second region of said first water jacket, which second region is remote from said first region.

16. The exhaust emission control arrangement of claim 14 wherein said second water jacket circulates water for cooling said exhaust channel.

17. The exhaust emission control arrangement of claim 4 further comprising a catalyst material which is held by said catalyst material holding structure.

18. The exhaust emission control arrangement of claim 17 wherein said catalyst material is an oxidizing material.

19. The exhaust emission control arrangement of claim 17 wherein said emission control arrangement is located within the power head of an outboard motor.

* * * * *